(12) United States Patent
Triller et al.

(10) Patent No.: US 6,735,838 B1
(45) Date of Patent: May 18, 2004

(54) OPTIMIZED STRAIN ENERGY ACTUATED STRUCTURES

(75) Inventors: Michael J. Triller, Hermosa Beach, CA (US); Lee E. Elliott, Torrance, CA (US)

(73) Assignee: Northrop Grumman Corporation, Los Angeles, CA (US)

( * ) Notice: Subject to any disclaimer, the term of this patent is extended or adjusted under 35 U.S.C. 154(b) by 0 days.

(21) Appl. No.: 09/216,150

(22) Filed: Dec. 18, 1998

(51) Int. Cl.[7] .............................................. H04R 17/00
(52) U.S. Cl. .................. 29/25.35; 29/897.2; 29/407.05; 29/709; 73/802
(58) Field of Search .............................. 29/897.2, 621.1, 29/897, 407.01, 407.05, 593, 705, 709, 25.35; 73/786, 760, 802; 52/108; 310/339, 317

(56) References Cited

U.S. PATENT DOCUMENTS

| | | |
|---|---|---|
| 4,817,768 A | 4/1989 | Schumacher |
| 5,305,507 A | 4/1994 | Dvorsky et al. |
| 5,424,596 A | 6/1995 | Mendenhall et al. |
| 5,525,853 A | 6/1996 | Nye et al. |

FOREIGN PATENT DOCUMENTS

DK    4008568    9/1990

Primary Examiner—Charles T. Jordan
Assistant Examiner—T. Nguyen
(74) Attorney, Agent, or Firm—John A. Miller; Warn, Burgess & Hoffmann, P.C.

(57) ABSTRACT

A process for designing spacecraft structural elements (20, 30) that increases spacecraft structure intrinsic damping to relax stiffness design constraints that are necessary for precision pointing requirements. The process includes specifically designing the spacecraft structural elements (20, 30) to have a stiffness that is intrinsically not suitable to meet mission pointing performance requirements in order to reduce weight and volume. To overcome this deficiency, the structural elements (20, 30) are equipped with strain energy control elements (44) that sense strain in the structural elements (20, 30) from on-board and external disturbances, and provide actuation of the structural elements (20, 30) to counteract the sensed strain. The strain energy control elements (44) can be any suitable control element that senses strain and actuates the structural element (20, 30), such as piezoelectric electric or electrostrictive control elements. By reducing the stiffness requirements of the structural elements (20, 30), the control elements (44) can more readily provide a desired actuation for damping purposes in order to meet pointing performance requirements, and thus the weight and volume of the structural elements (20, 30) can be reduced over those known in the art. Relaxing the stiffness requirements of the structural elements (20, 30) allows the structural element (20, 30) to be made of materials having higher strength properties, instead of higher stiffness properties, thus allowing the structural element (20, 30) to meet the strength requirements to survive launch and deployment loads.

25 Claims, 3 Drawing Sheets

OPTIMIZED STRAIN ENERGY ACTUATED STRUCTURES

BACKGROUND OF THE INVENTION

1. Field of the Invention

This invention relates generally to spacecraft structural elements and, more particularly, to a process of augmenting a spacecraft structure's intrinsic damping to relax stiffness design constraints that arise due to precision pointing requirements and lead to excessive spacecraft structural weight and volume.

2. Discussion of the Related Art

The design of spacecraft structural elements is based on certain criteria. Particularly, certain spacecraft structural elements must be designed to have the strength necessary to survive launch and deployment loads, and to meet the stiffness requirements that provide accurate and stable pointing performance of spacecraft components to meet mission requirements in the presence of on-board and external disturbances. Modern spacecraft structures are generally composite structures that are light weight and are not able to easily dissipate mechanical energy from vibrations. The stiffness requirements for spacecraft structures are determined by many factors, such as jitter suppression of payload that is forced by on-board drive motors such as stepper motors. These motors provide many functions, such as antenna pointing, IR and visible light sensor pointing, solar array drives, as well as many other applications. When the drive motor disturbance frequencies align and couple with spacecraft structural modes, large response amplitudes can result that effect the pointing performance.

The conventional practice to design and develop spacecraft structural elements to meet required mission performance generally focuses on detailed analysis and tests to verify that the structural modes and disturbance sources do not adversely couple. This is especially true in the absence of significant spacecraft structural damping, which is typically the case for modern composite and aluminum honeycomb sandwich spacecraft panel construction, and for graphite or aluminum booms and tubes.

Much of a spacecraft's weight and physical volume is in its structure. Excessive weight and volume limits the ability to store payload and drives the spacecraft to larger, more expensive launch vehicles with larger fairings and throw-weight capacities. Reductions in weight and volume can be provided by relaxing stiffness design requirements of certain structural elements, while insuring that the necessary strength requirements are met. This typically cannot be accomplished without compromising precision pointing performance because the reduction in stiffness increases the DC (low frequency) disturbance-to-response transfer function magnitudes so that for a given disturbance magnitude, greater pointing and stability errors are produced. These peak responses are the pointing performance design drivers.

The disturbance-to-response peak transfer function magnitude may be reduced by augmenting a spacecraft structure's intrinsic damping. Certain spacecraft structural designs begin by attempting to meet pointing performance by a stiffness driven design initially, and then by adding damping to meet more stringent requirements. By reducing the disturbance peaks, structural load and strain is reduced, helping to meet strength design requirements. Providing piezoelectric sensor and actuator elements embedded within the composite spacecraft structure is an example of an effective way to dampen movements of the structure. Damping can be applied to compensate for vibrational or other loading forces on the structures. U.S. Pat. No. 5,424,596 issued to Mendenhall et al., titled "Activated Structure", and assigned to the assignee of this application, discloses the use of piezoelectric actuator/sensor elements disposed on a spacecraft structural element that provides this type of damping. Actuator performance is typically reduced in conjunction with stiff structural host members that reduce actuation strain capability and achievable damping performance. Incorporation of actuator elements in structural elements with high stiffness thus prevents the actuators from having a significant effect on reducing peak response levels of the structure. The strength design is then compromised by the increased response level.

It is an object of the present invention to provide a process for an integrated design of a precision pointing spacecraft structure that relaxes the intrinsic stiffness of the structure necessary to meet strength and mission pointing requirements.

SUMMARY OF THE INVENTION

In accordance with the teachings of the present invention, a process for designing spacecraft structural elements is disclosed that includes increasing the spacecraft structure intrinsic damping to relax stiffness design constraints that are necessary for precision pointing requirements. The process includes specifically designing the spacecraft structural elements to have an intrinsic stiffness optimal for damping augmentation but does not meet mission pointing performance requirements. To overcome this deficiency, the structural elements are equipped with strain energy control elements that sense strain in the structural elements from on-board and external disturbances, and provide actuation of the structural elements to counteract the sensed strain. The strain energy control elements can be any suitable control element that senses strain and actuates the structural element, such as piezoelectric or electrostrictive control elements. By reducing the stiffness requirements of the structural elements, the control elements can more readily provide the desired actuation for damping purposes, and thus the weight and volume of the structural elements can be reduced over those known in the art. Controlling the strain energy in the structural elements allows the structural element to be made of materials having higher strength properties, instead of higher stiffness properties, thus allowing the structural element to meet the strength requirements to survive launch and deployment loads.

Additional objects, advantages, and features of the present invention will become apparent from the following description and appended claims, taken in conjunction with the accompanying drawings.

DETAILED DESCRIPTION OF THE PREFERRED EMBODIMENTS

Figure 1:
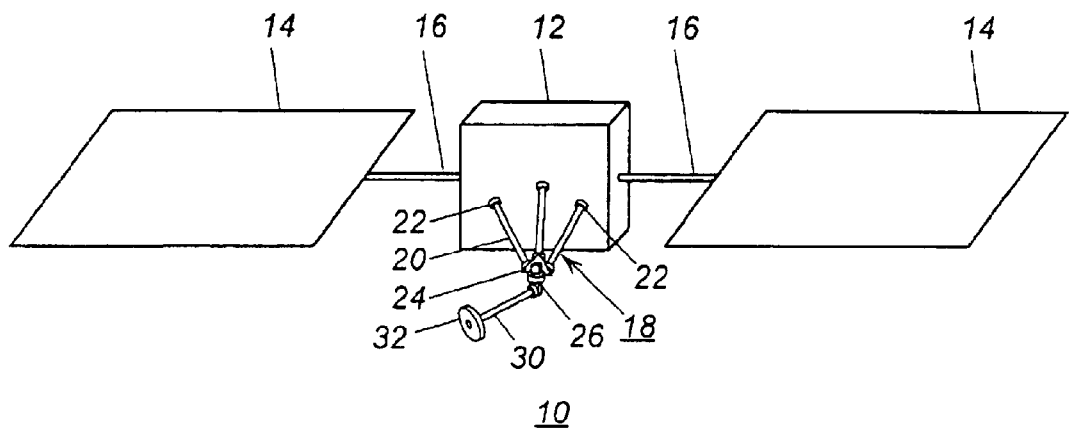
FIG. 1 is a perspective plan view of a spacecraft having a specially designed payload structure, according to an embodiment of the present invention.

The following description of the preferred embodiments directed to an optimized strain energy structure for a spacecraft is merely exemplary in nature and is in no way intended to limit the invention or its applications or uses.

According to the invention, a process is provided to design spacecraft structures to survive launch, deployment and mission pointing requirements by using strain based sensors and actuators, such as piezoelectric elements or electrostrictive elements, and a damping control system to increase spacecraft structure damping, thus allowing a reduction in structural weight and volume of the spacecraft, while at the same time adding robustness to the spacecraft structural design. This is accomplished by using an integrated design process where augmented damping levels are used in the initial structural element sizing. The structural elements are sized to meet the launch load, deployment load, and on-orbit strength requirements, but not to have the pointing stiffness requirements as those in the prior art. The structural elements can be designed to meet the launch, deployment and on-board strength requirements with the damping control system on or off. Maximum damping is introduced into the structure by an optimization of the spacecraft structure strain energy distribution.

By designing the structure to be less stiff at target actuator locations, according to the invention, more efficient actuation is achieved. By optimally introducing strain energy into the actuator and sensor target locations, maximum actuation force, and therefore damping may be obtained. Actuator locations are determined as a concurrent outcome of the optimization process. Strain based actuators and sensors are then sized to provide optimal coverage in the increased strain energy target area. Strain energy distributions are optimized using a finite element representation of the structure. Modal strain energy distributions are mapped spatially and cross-sectional properties, wall thicknesses, materials, and other stiffness parameters are optimally adjusted to reduce weight and volume, and to localize strain energy in modes that are coupled to disturbance inputs.

This integrated approach is performed by iteration on a cost function that weighs objectives, such as actuation figure of merit and structure weight subject to strength and mission pointing performance constraints. Precision pointing performance is obtained by greatly reducing the structural response peaks from disturbance source locations in conjunction with standard disturbance mitigation techniques as appropriate, such as isolation, wheel or cryo-cooler piston balancing, etc. Also, the strain based sensor/actuator system has a coefficient of thermal expansion optimally matched to the structural element to prevent thermal distortion of the structural baseline that would otherwise degrade pointing performance and stability without thermal control. The synergistic optimization of actuator location and structural strain energy is obtained by reducing tube or panel cross-sections which allows smaller, lighter fittings. The reduction in weight of payload support structure will facilitate smaller drive motors saving additional weight and volume. Tailoring of the strain energy distribution may also be accomplished by utilizing known spacecraft materials with higher strength properties instead of higher stiffness properties, which are usually associated with lower strength. This additionally helps to meet the strength design goals while optimizing damping performance.

The spacecraft structural design process of the invention recognizes that reduced weight and volume of the spacecraft structure may be obtained by the relaxation of stiffness design constraints on spacecraft precision pointing platforms while maintaining, or even improving, pointing performance. Advantages include the capacity to carry more payload, carry less fuel for attitude orientation (pointing) or use fuel more conservatively, downsize the launch vehicle required for boost, and to minimize the analysis/design/test cycle time typically required to carefully partition structural modes from harmonic disturbance sources and then validate on-orbit performance. The system may further be used to reduce strength requirements by utilizing the active damping system during launch and deployment. The reduction in peak jitter response in the transfer function will produce initial designs that are more robust to changes that occur later in the design cycle. Careful partitioning of disturbance frequencies and structural modes is no longer critical. This reduces schedule and cost burdens brought on by last minute wholesale redesign.

Figure 2:
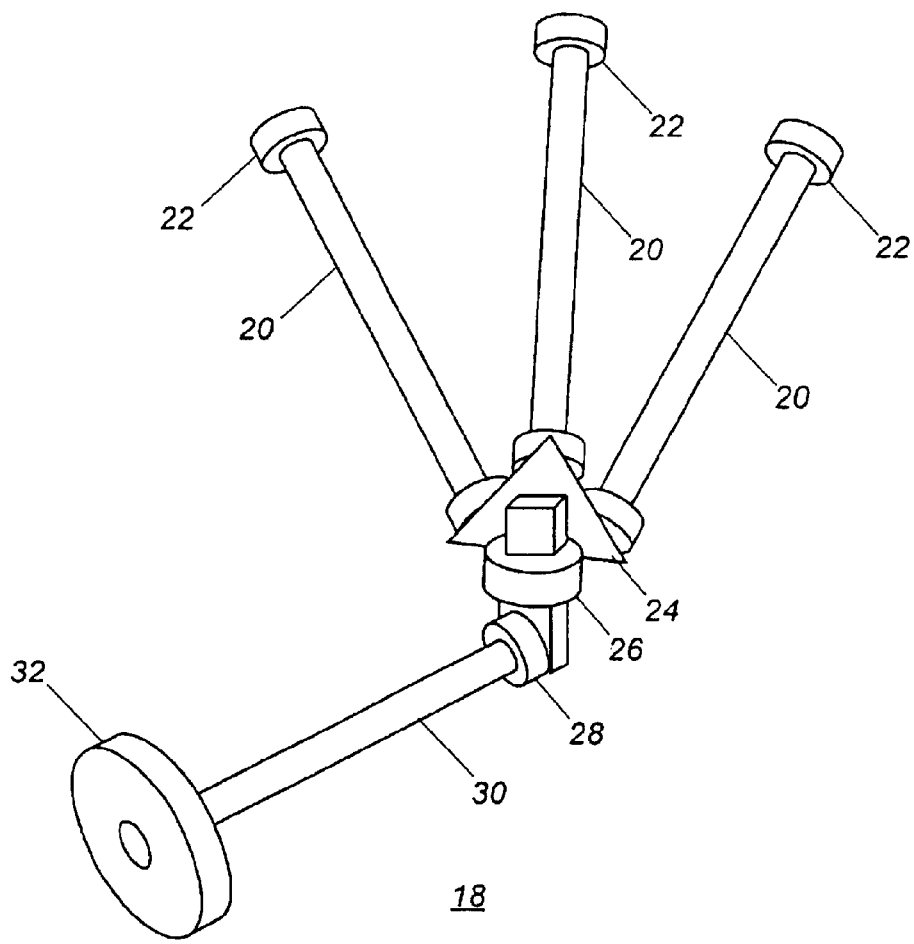
FIG. 2 is a perspective view of a known payload structure that can be attached to the spacecraft shown in FIG. 1.

The spacecraft structural design process of the invention can better be understood by viewing FIGS. 1–8. FIG. 1 shows a perspective plan view of a spacecraft 10, including a spacecraft body 12 and solar array panels 14 attached to the body 12 by booms 16. An instrument support structure 18 includes three boom tube structural elements 20 connected to the spacecraft body 12 by fittings 22 at one end, and a structural element 24 at an opposite end. A more detailed view of the support structure 18 separated from the spacecraft 10 is shown in FIG. 2. A harmonic drive motor 26 is connected to the support structure fitting element 24, and an elbow fitting 28 is connected to the drive motor 26. A boom tube structural element 30 is connected to the fitting 28 at one end, and a payload element 32 is connected to an opposite end of the element 30. The configuration of the support structure 18 is common in the art, and is intended to represent any type of support structure mounted to a spacecraft for pointing and directing the payload element 32 in a desirable manner. The boom tube elements 20 and 30 can be any boom tube suitable for the particular application of the structure 18, and can be made of any suitable material or composite consistent with spacecraft structures. The elements 20 and 30 can be cylindrical, rectangular, or any suitable geometric configuration, and can be hollow, thin walled, solid, or formed of a honeycomb structure, as would be well understood to those skilled in the art.

The payload element 32 is intended to represent any type of suitable element such as a sensor, antennae, telescope, etc. Actuation of the motor 26 causes the structural element 30 to change position, thus altering the pointing direction of the payload element 32. As discussed above, the operation of the various drive motors, actuators, etc. necessary for the operation of the spacecraft 10 may cause vibrational modes in the spacecraft 10 that adversely effects the pointing direction of the element 32.

Figure 3:
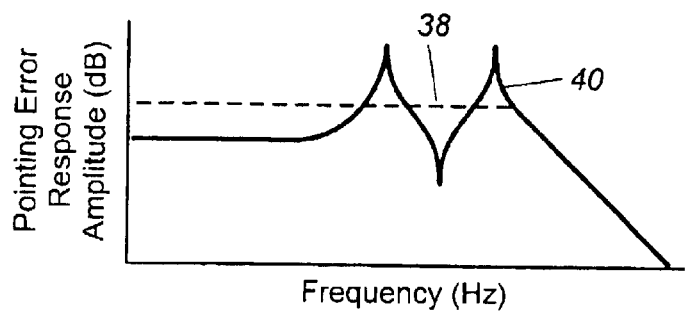
FIG. 3 is a graph showing pointing error, where pointing error response amplitude is on the vertical axis and frequency is on the horizontal axis, of a known spacecraft structural element that is stiffness designed with no controlled damping.

FIG. 3 is a graph with disturbance frequency on the horizontal axis and pointing error response on the vertical axis to illustrate the pointing performance of the element 32 for various structure designs discussed below. A pointing performance goal is shown as a horizontal dotted line 38, and represents a maximum pointing error response at all frequencies for a specific mission requirement, in that any point below the performance goal line 38 is acceptable for that particular mission. A graph line 40 illustrates the pointing error of the element 32 for the structure 18 of the prior art design over the range of disturbance frequencies that exist on the spacecraft 10. For higher frequencies, no vibrational disturbance is generated to cause a pointing error.

For the known support structure 18, the design stiffness of the structural elements 20 and 30 provide an acceptable pointing of the element 32, except in two frequency bands where the disturbance response peaks above the goal line 38. At these disturbance frequencies, the vibration of the spacecraft couples with the structural elements in the support structure 18 to cause directional pointing errors of element 32 to be unacceptable for that particular mission. These peaks represent the disturbance response peaks referred to above. Therefore, the design of the support structure 18 does not satisfy the entire required pointing performance.

Figure 4:
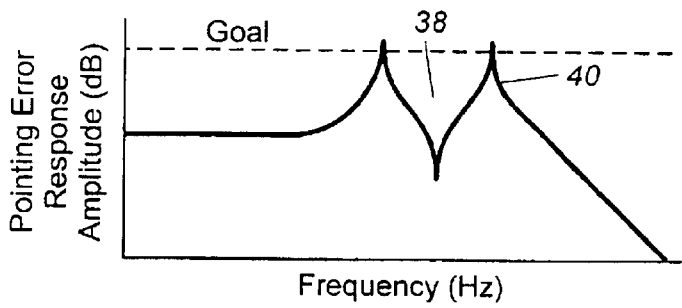
FIG. 4 is the graph of FIG. 3 showing the pointing error of a known spacecraft structural element that is stiffness designed with controlled damping augmentation.

As mentioned above, it is known to equip the existing stiff support structures for spacecraft designs with actuator/sensor elements to add damping to the structural elements of the spacecraft, as discussed in the '596 patent. FIG. 4 shows the same graph as in FIG. 3, but overlayed with a graph where actuator/sensor elements are provided on the structural elements of the support structure 18 to provide controlled damping. The pointing error for a "closed-loop" type system of this type that includes the actuator/sensor elements on the structural elements of the support structure 18, basically follows the same pointing error as the "open-loop" pointing error of the structural elements of the support structure 18 without the actuator/sensor elements, except for a slight reduction at the peak locations. Although there is a decrease in the pointing or peaks at the disturbance frequencies that caused the element 32 to point in an unacceptable direction, this decrease in the peaks is minimal, and does not reduce the amplitude below the performance goal line 38. Because of the high stiffness design of these structural elements, the actuation of the structural elements is minimal. Therefore, the existing support structure 18 would not significantly benefit from these types of actuator/sensor elements.

Figure 5:
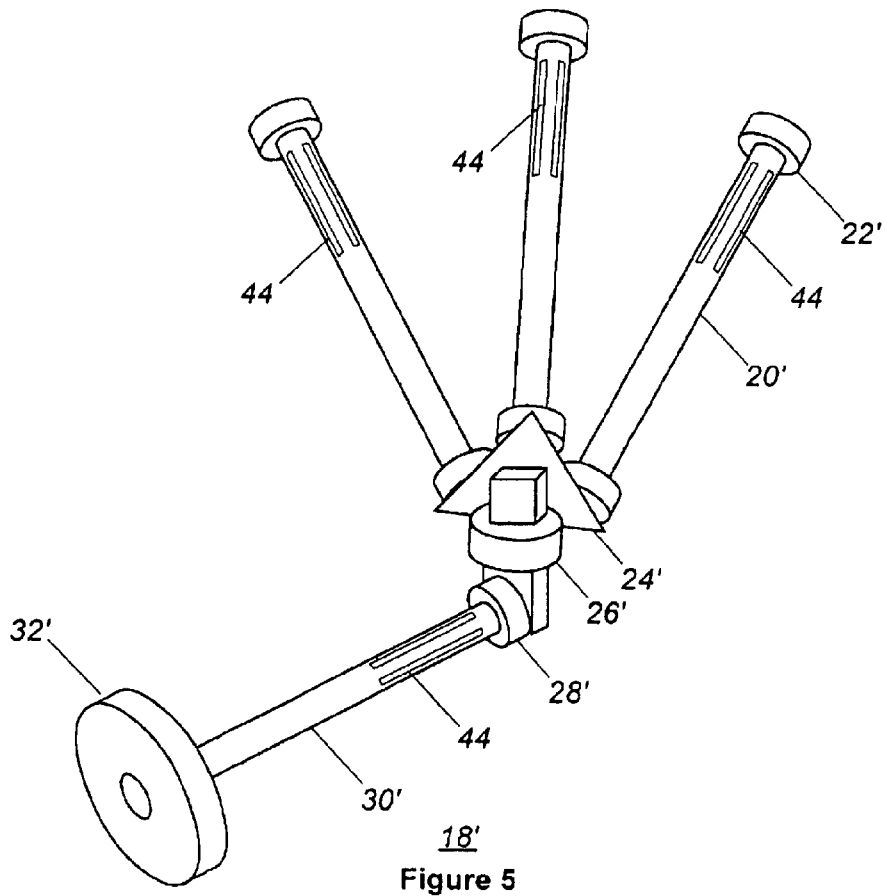
FIG. 5 is a specially designed payload structure, according to an embodiment of the present invention, that is attached to the spacecraft shown in FIG. 1.

As discussed above, the present invention proposes first reducing the stiffness of the structural elements of the support structure 18. Reducing the stiffness of the structural elements can be accomplished in different ways, such as by reducing the structural cross-section and thicknesses of the elements, reducing the fitting sizes, using increased strength materials that typically have reduced stiffness, reducing drive motor size, etc. FIG. 5 shows a support structure 18' incorporating these changes to replace the support structure 18. In this figure, like elements are labeled with the same reference numeral and a prime. Each of the elements of the support structure 18' are smaller in size than the corresponding element in the support structure 18. Thus, the elements of the support structure 18' have a reduced stiffness than those elements in the support structure 18. The stiffness of the structural elements of the support structure 18' would not satisfy the pointing requirements. Also, in certain designs, the strength of the structural elements of the support structure 18' may not satisfy launch and deployment loads.

To compensate for the lack of stiffness in the structural elements of the support structure 18', the structural elements 20' and 30' are equipped with a plurality of strain energy control elements 44 optimized for this example application. The strain energy control elements 44 can be any suitable control element that senses the strain in the elements 20' and 30', and provides a compensating, or damping, actuation to the sensed strain that causes the structural elements 20' and 30' to maintain their intended position. For example, the control elements 44 can be piezoelectric ceramics, such as lead zirconate titanate (PZT), or electrostrictive ceramics, such as lead molybdenum niobate (PMN). U.S. Pat. No. 5,305,507 issued to Dvorsky et al., title "Method For Encapsulating A Ceramic Device For Embedding In Composite Structures", discloses actuator/sensor control elements suitable for this application. The control elements 44 would be electrically connected to a damping control circuit (not shown) that converts the sensed strain in the structural elements to a representative voltage, and provides voltage control signals for actuating the elements in response to the sensed strain. The particular control elements 44 used would be matched to the coefficient of thermal expansion of the structural elements to minimize thermal distortion of the elements 44 causing additional pointing errors. The specific optimization design would determine the size of the control elements 44, the number of control elements 44, the location of the control elements 44 on the structural elements 20' and 30', the length of the control elements 44, whether the control elements are located outside or within the structural elements 20' and 30', etc. The specific type of control element and control scheme for compensation for strain in the structural elements 20' and 30' forms no part of the invention, as such a design would be optimized depending on the particular mission requirements and structural configuration.

Figure 6:
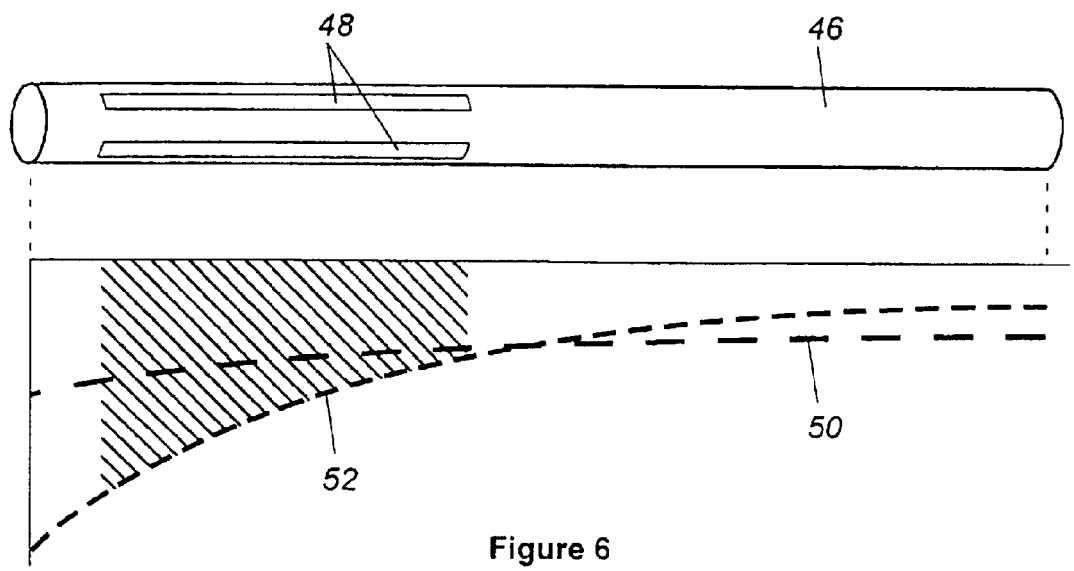
FIG. 6 shows a spacecraft structural element incorporating an optimized strain energy design of the invention.

FIG. 6 shows a spacecraft structural element 46 that includes four strain-energy control elements 48 symmetrically positioned around and outside of the structural element 46 at one end thereof. The structural element 46 is shown relative to a graph that shows the modal strain energy along the length of the element 46. The control elements 48 are positioned at an end of the structural element 46 where the maximum strain energy would be located, such as where the element 46 is connected to the spacecraft 10. The control elements 48 introduce bending and axial damping into the modes where disturbances cause structural pointing errors. A graph line 50 shows the energy profile along the length of the structural element 46 for a stiff structural element of the type in the prior art, and a graph line 52 shows the energy profile for an optimized structural element of the invention. As is apparent, strain on the structural element 46 has less energy for the stiff structural element than for the optimized structural element of the invention. Therefore, sensing and actuation of the control elements 48 would have a greater effect on the damping in the structural element 46 for the optimal structural element.

Figure 7:
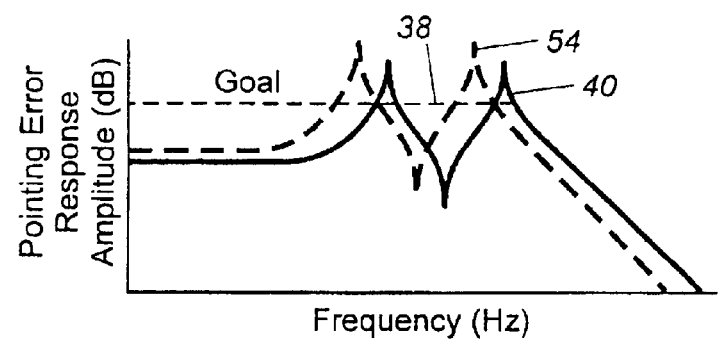
FIG. 7 is the graph of FIG. 3 showing the pointing error of a spacecraft structural element of the invention without controlled damping.
Figure 8:
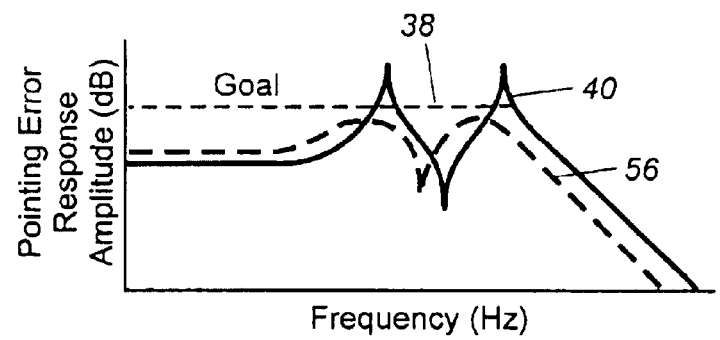
FIG. 8 is the graph of FIG. 3 showing the pointing error of a spacecraft structural element of the invention including controlled damping augmentation.

FIG. 7 shows the graph of FIG. 3 including a pointing performance graph line 54 representing the pointing performance of the reduced structural elements without using the compensating effect of the control elements 44 and 48. In other words, because the intrinsic stiffness of the structural elements of the support structure 18' is significantly reduced in the design of the present invention, the pointing performance of the structural elements decreases without the use of the control elements 44 and 48. However, because the strength of the structural elements can be increased using different, but smaller sized materials, the strength of the structural elements can actually be increased. With these types of structural elements, flexibility has been introduced in the system and DC pointing error from disturbances actually increases, as indicated by the peaks above the goal line 38. Strength requirements are met for this design, but mission pointing performance goals are not. By providing the damping control circuit that controls the control elements 44 and/or 48 with the reduced size structural elements of structure 18', the damping of the structural elements can be increased and the performance requirements can be met. This is shown in FIG. 8 as pointing performance graph line 56.

The foregoing discussion discloses and describes merely exemplary embodiments of the present invention. One skilled in the art will readily recognize from such discussion, and from the accompanying drawings and claims, that various, changes, modifications and variations can be made therein without departing from the spirit and scope of the invention as defined in the following claims.

What is claimed is:

1. A method of providing a structural member for a spacecraft that satisfies predetermined pointing performance requirements for a particular space mission, said method comprising the steps of:

making the structural member out of a certain material and to have a size configuration so that the member intentionally does not have an intrinsic stiffness that would satisfy the pointing performance requirements for the mission over a complete range of possible disturbance frequencies; and mounting strain energy control elements to the structural member that sense strain in the structural member, said control elements providing a compensating actuation of the structural member to the sensed strain, said control elements acting to dampen the member acting to actuate the member in response to the sensed strain so as to cause the structural member to satisfy the pointing performance requirements for the mission over the complete range of disturbance frequencies.

2. The method according to claim 1 wherein the step of making the structural member includes making the structural member as part of a support structure for supporting a pointing element selected from the group consisting of sensors, telescopes, and antennas.

3. The method according to claim 1 wherein the step of making the structural member includes one or more of the steps of reducing the cross-section of the member, reducing wall thicknesses of the member, and reducing fitting sizes associated with the member from a design based on a structural member that has an intrinsic stiffness that satisfies the pointing performance requirements for that mission.

4. The method according to claim 1 wherein the step of making the structural member includes making the structural member out of a less rigid and a higher strength material than a material that would be used for a structural member having a stiffness that would satisfy the pointing performance requirements.

5. The method according to claim 4 wherein the step of making the structural member includes making the structural member out of a material that allows the structural member to satisfy launch and deployment loads.

6. The method according to claim 1 wherein the step of making the structural member includes making the structural member so that it does not satisfy launch and deployment loads, and wherein the step of mounting strain energy control elements includes using the control elements to sense strain and provide actuation so that the member does survive launch and deployment loads.

7. The method according to claim 1 wherein the step of mounting control elements includes mounting the control elements to a location on the member that optimizes the strain energy distribution to maximize performance.

8. The method according to claim 1 wherein the step of mounting control elements includes mounting piezoelectric control elements.

9. The method according to claim 1 wherein the step of mounting control elements includes mounting electrostrictive control elements.

10. The method according to claim 1 wherein the step of mounting control elements includes mounting a plurality of control elements where each control element includes a plurality of separate sensing elements and actuation elements packaged as a single unit.

11. The method according to claim 1 wherein the step of mounting control elements includes mounting the control elements at a location on the member close to where the member is attached to a mounting location.

12. The method according to claim 1 wherein the step of mounting control elements includes mounting control elements that have a coefficient of thermal expansion that is matched to a coefficient of thermal expansion of the structural element.

13. A method of designing a structural member for a spacecraft that satisfies predetermined launch load, deployment load and pointing performance requirements for a particular space mission, said method comprising the steps of:

designing the structural member to be made out of a certain material and to have a certain size configuration so that the member has an intrinsic stiffness that intentionally does not satisfy the pointing performance requirements for the mission over a complete range of possible disturbance frequencies; and designing strain energy control elements to be mounted to the structural member that include sensor elements that will sense strain in the structural member and actuation elements that will provide a compensating actuation to the structural member to the sensed strain, said control elements providing a damping performance to optimize a strain energy distribution to cause the structural member to satisfy the pointing performance requirements for the mission over the complete range of possible disturbance frequencies.

14. The method according to claim 13 wherein the step of designing the structural member includes one or more of the steps of reducing the cross-section of the member, reducing wall thicknesses of the member, and reducing fitting sizes associated with the member from a design based on a structural member that has an intrinsic stiffness that would satisfy the pointing performance requirements for that mission.

15. The method according to claim 13 wherein the step of designing the structural member includes designing the structural member out of a material that is less rigid and has a higher strength than a material that would be used for a structural member having a stiffness that would satisfy the pointing performance requirements.

16. The method according to claim 15 wherein the step of designing the structural member includes designing the structural member to be of a material that allows the structural member to satisfy launch and deployment loads.

17. The method according to claim 13 wherein the step of designing the structural member includes designing the structural member so that it does not satisfy launch and deployment loads, and wherein the step of designing the control elements includes designing the control elements to sense strain and provide actuation so that the member does survive launch and deployment loads.

18. The method according to claim 13 wherein the step of designing control elements includes designing piezoelectric control elements, where each piezoelectric control element includes a plurality of separate sensing elements and actuation elements packaged as a single unit.

19. The method according to claim 13 wherein the step of designing control elements includes designing electrostrictive control elements, where each electrostrictive control element includes a plurality of separate sensing elements and actuation elements packaged as a single unit.

20. The method according to claim 13 wherein the step of designing the control elements includes designing the control elements to be mounted at a location on the member proximate a location where the member is attached to a mounting location.

21. The method according to claim 13 wherein the step of designing control elements includes designing the control elements to have a coefficient of thermal expansion that is matched to a coefficient of thermal expansion of the structural element.

22. A method of designing a structural member for a spacecraft that satisfies predetermined launch load, deployment load and pointing performance requirements for a particular space mission, said structural member being part of a support structure that supports and aligns a precision pointing element on the spacecraft, said method comprising the steps of:

designing the structural member to be made out of a certain material and to have a certain size configuration so that the member has an intrinsic stiffness that does not satisfy the pointing performance requirements for the mission, said step of designing including designing the structural member to have one or more of a reduced cross-section, reduced wall thickness, or reduced fitting size from a design based on a structural member that does have an intrinsic stiffness that would satisfy the pointing requirements for that mission, and designing the structural member out of a material that is less rigid and has a higher strength than a material that would be used for a structural member having a stiffness that would satisfy the pointing performance requirements; and designing strain energy control elements to be mounted to the structural member that include sensor elements that will sense strain in the structural member and actuation elements that will provide a compensating actuation to the structural member to the sensed strain, said control elements providing a damping performance to optimize a strain energy distribution to cause the structural member to satisfy the pointing performance requirements for the mission.

23. The method according to claim 22 wherein the step of designing the structural member includes designing the structural member to be of a material that allows the structural member to satisfy launch and deployment loads.

24. The method according to claim 22 wherein the step of designing the structural member includes designing the structural member so that it does not satisfy launch and deployment loads, and wherein the step of designing the control elements includes designing the control elements to sense strain and provide actuation so that the member does survive launch and deployment loads.

25. The method according to claim 22 wherein the step of designing the control elements include designing the control elements to be mounted at a location on the member proximate a location where the member is attached to a mounting location.

\* \* \* \* \*